United States Patent [19]
Hashimoto

[11] Patent Number: 5,784,132
[45] Date of Patent: Jul. 21, 1998

[54] DISPLAY DEVICE

[75] Inventor: Yoshihiro Hashimoto, Kanagawa, Japan

[73] Assignee: Sony Corporation, Tokyo, Japan

[21] Appl. No.: 877,484

[22] Filed: Jun. 16, 1997

Related U.S. Application Data

[63] Continuation of Ser. No. 544,565, Oct. 18, 1995, abandoned.

[30] Foreign Application Priority Data

Oct. 19, 1994 [JP] Japan ............... 06-280095

[51] Int. Cl.$^6$ .......... G02F 1/136; G02F 1/1337; G02F 1/1338
[52] U.S. Cl. .......... 349/44; 349/111; 349/124; 349/138
[58] Field of Search .......... 359/59, 67, 74, 359/76, 79

[56] References Cited

U.S. PATENT DOCUMENTS

| | | | |
|---|---|---|---|
| 4,744,639 | 5/1988 | Tsuboyama | 359/79 |
| 5,003,356 | 3/1991 | Wakai et al. | 359/79 |
| 5,055,899 | 10/1991 | Wakai et al. | 359/79 |
| 5,285,301 | 2/1994 | Shirahashi et al. | 359/59 |
| 5,327,001 | 7/1994 | Wakai et al. | 359/79 |
| 5,414,547 | 5/1995 | Matsuo et al. | 359/67 |
| 5,523,865 | 6/1996 | Furuta et al. | 359/59 |

FOREIGN PATENT DOCUMENTS

| | | |
|---|---|---|
| 9 444 621 A2 | 9/1991 | European Pat. Off. . |
| 0 569 601 A1 | 11/1993 | European Pat. Off. . |
| 0 603 866 A1 | 6/1994 | European Pat. Off. . |
| 0 544 060 A2 | 8/1994 | European Pat. Off. . |
| 0465111 | 1/1992 | Japan ............... 359/59 |

*Primary Examiner*—William L. Sikes
*Assistant Examiner*—Julie Ngo
*Attorney, Agent, or Firm*—Hill & Simpson

[57] ABSTRACT

The drive substrate and an opposed substrate are joined to each other through a gap in which a liquid crystal is held. Pixels electrodes are provided on the drive substrate in a matrix form and, an opposed electrode is formed on the entire surface of the opposed substrate. The drive substrate 1 has a plurality of thin film transistors each for switching one of the pixel electrodes, a first interlayer insulating film for covering the thin film transistors, interconnect electrodes patterned on the first interlayer insulating film and connected to the thin film transistors, a second interlayer insulating film for covering the interconnect electrodes and a black matrix patterned on the second interlayer insulating film and used for shielding the thin film transistors beneath the second interlayer insulating film. The black matrix is covered by a planerization layer and the pixel electrodes are patterned on the planerization layer. The pixel electrodes are connected to the interconnect electrodes through the black matrix 10 which is made up of a metal film. In a display device of the active matrix type, an on-chip black structure is thus obtained by providing a black matrix also referred to as a light-shielding layer on a drive substrate.

15 Claims, 8 Drawing Sheets

DISPLAY DEVICE

This is a continuation of application Ser. No. 08/544,565, filed Oct. 18, 1995 abd.

BACKGROUND OF THE INVENTION

1. Field of the Invention

The present invention relates to an active matrix liquid crystal panel and other representatives of display device. To put it in more detail, the present invention relates to the structure of a black matrix for shielding portions other than pixel openings of a display device.

2. Description of Related Art

Figure 8:
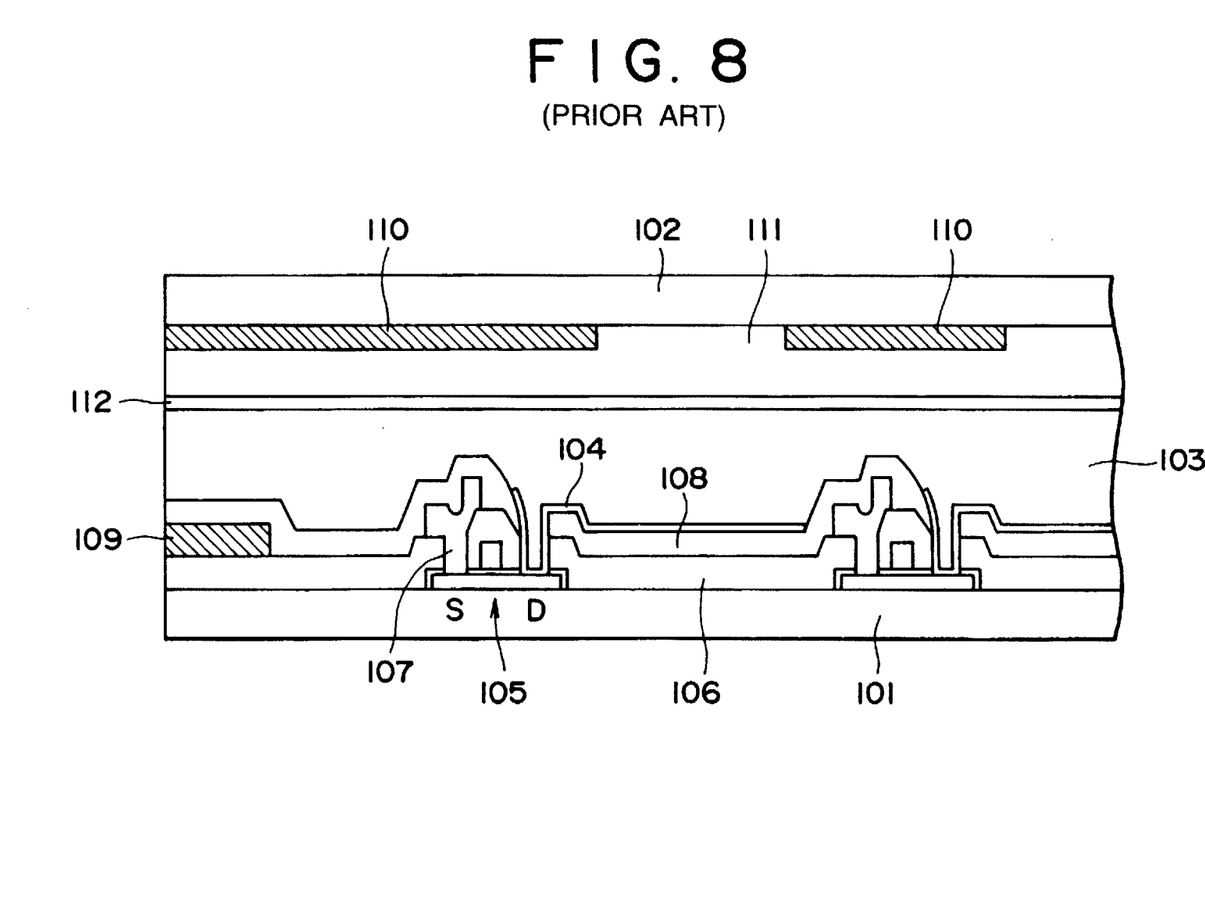
FIG. 8 is a cross-sectional model diagram showing parts of the display device.

A display device is explained concisely by referring to FIG. 8. The display device has a panel structure comprising a drive substrate 101, an opposed substrate 102 joined to the drive substrate 101 through a predetermined gap and a liquid crystal 103 held in the gap. The drive substrate 101 has pixel electrodes 104 laid out in a matrix form and a plurality of thin film transistors 105 for switching the pixel electrodes 104 individually. The thin film transistors 105 are covered by a first interlayer insulating film 106. An interconnect electrode 107 is provided on each of the thin film transistors 105, being electrically connected to a source region S of the thin film transistor 105. A second interlayer insulating film 108 is formed so as to cover the interconnect electrodes 107. The pixel electrodes 104 described above are provided on the second interlayer insulating film 108. Each of the pixel electrodes 104 is connected electrically to a drain region D of any one of the thin film transistors 105 through a contact hole formed in the first and second interlayer insulating films 106 and 108. In addition, a black mask 109 comprised of a metal film having a light-shielding characteristic is patterned on the circumference of the drive substrate 101. On the other hand, a black matrix 110 for shielding portions other than the pixel electrodes 104 is formed on the inner surface of the facing substrate 102. The black matrix 110 may be formed by patterning a metal film having a light--shielding characteristic. Each opening surrounded by the black matrix 110 is aligned with one of the pixel electrodes 104. A planerization layer 111 is formed for planerizing the unevenness of the black matrix 110. A layer of transparent opposed electrodes 112 is formed over the whole surface of the black matrix 110.

In the structure shown in FIG. 8, only partial circumference portions of the black matrix are formed on the drive-substrate side. Other portions are all provided on the opposed-substrate side. For this reasons, it is necessary to accurately adjust the positions of the opposed and drive substrates. A pattern of the black matrix is formed by considering both the accuracy of the adjustment of the opposed and drive substrates' positions and the accuracy of the formation of the black matrix on the opposed-substrate side. In this case, it is necessary to reserve in advance a margin for absorbing errors of the positional adjustment. Dimensions of the pattern of the black matrix larger than required are therefore set. As a result, a problem caused by the fact that the aperture ratio of the pixel is sacrificed is encountered. As described above, the accurate adjustment of the positions of the opposed and drive substrates is required, giving rise to a problem that an alignment apparatus for use in the adjustment must be precise and, thus, expensive. The structure on the opposed-substrate side comprises a black matrix, a planerization layer and a layer of opposed electrodes superimposed one upon another. When coating the planerization layer, a film-thickness unevenness is most likely resulted in due to the unevenness of the black matrix. As a result, the film-thickness unevenness gives rise to still another problem that gap unevenness is resulted in among the pixels, producing poor contrast.

SUMMARY OF THE INVENTION

In order to solve the problems encountered in the technology as described above, the following means are provided. To be more specific, the present invention provides a display device with a basic structure comprising: a drive substrate having pixel electrodes arranged in a matrix form; an opposed substrate having opposed electrodes which opposed substrate is joined to the drive substrate through a predetermined gap; and an electro-optical material held in the gap.

The display device is characterized in that the following components are formed on the drive substrate: a plurality of thin film transistors for individually switching the pixel electrodes; a first interlayer insulating film for covering the thin film transistors; interconnect electrodes each electrically connected to one of the thin film transistors which interconnect electrodes are patterned on the first interlayer insulating film; a second interlayer insulating film for covering the interconnect electrodes; and a black matrix, also referred to as a light-shielding layer, for shielding the thin film transistors beneath the second interlayer insulating film, which black matrix is patterned above the second interlayer insulating film.

Preferably, the black matrix is covered by a planerization layer and the pixel electrodes are patterned on the planerization layer. The black matrix is comprised of a metal film and the pixel electrodes are connected to the interconnect electrodes beneath the pixel electrodes through the metal film. As an alternative, the black matrix is comprised of a metal film having a floating potential and the pixel electrodes are connected directly to the interconnect electrodes, bypassing the black matrix. In some cases, the interconnect electrodes overlap the pixel electrodes above the interconnect electrodes, functioning as a black matrix bordering the pixel electrodes.

In one aspect of the present invention, the drive substrate described above is divided into a pixel array unit including the pixel electrodes and the thin film transistors for individually switching the pixel electrodes, and a peripheral unit including a drive circuit for operating the pixel array unit. In this case, the opposed substrate described above is equipped with a black matrix (or a second light-shielding layer) which is aligned with the peripheral unit. In a typical configuration, the black matrix (the first light-shielding layer) provided on the drive-substrate side covers the regions of thin film transistors in the pixel array unit and, in addition, is also extended to a region of the peripheral unit excluding the drive circuit and, on the other hand, the black matrix (the second light-shielding layer) provided on the opposed-substrate side selectively shields only the drive circuit region. In some cases, the pixel array unit has effective pixels each comprising a pair of pixel electrode and thin film transistor for switching the pixel electrode, and dummy pixels each comprising a thin film transistor and no pixel electrode driven the thin film transistor. In such a case, a structure can be contrived so that the black matrix (the first light-shielding layer) completely covers the dummy pixels.

According to the present invention, thin film transistors formed by integrating them on a drive substrate are covered, insulated and protected by a first interlayer insulating film. Interconnect electrodes of the thin film transistors are patterned on the first interlayer insulating film. The interconnect electrodes are covered, insulated and protected by a second interlayer insulating film. Furthermore, a black matrix (a first light-shielding layer) comprised of a metal film is typically patterned on the second interlayer insulating film. By using a metal film, the black matrix can be patterned with a high degree of accuracy and, at the same time, since the black matrix is insulated and separated from the interconnect electrodes, neither short-circuit nor the like are resulted in. On the top of that, a planerization layer and other layers are deposited on the black matrix and pixel electrodes are patterned thereon. Since these pixel electrodes are electrically connected to the interconnect electrodes through the black matrix, the contact structure can be designed in many ways. The configuration described above allows the so-called on-chip black-matrix structure to be obtained, no longer requiring accurate adjustment of the positions of the facing and drive substrates. In some cases, by providing a black matrix (a second light-shielding layer) that covers only the peripheral unit on the facing-substrate side, a more perfect light-shielding structure can be obtained.

DETAILED DESCRIPTION OF THE PREFERRED EMBODIMENT

Figure 1:
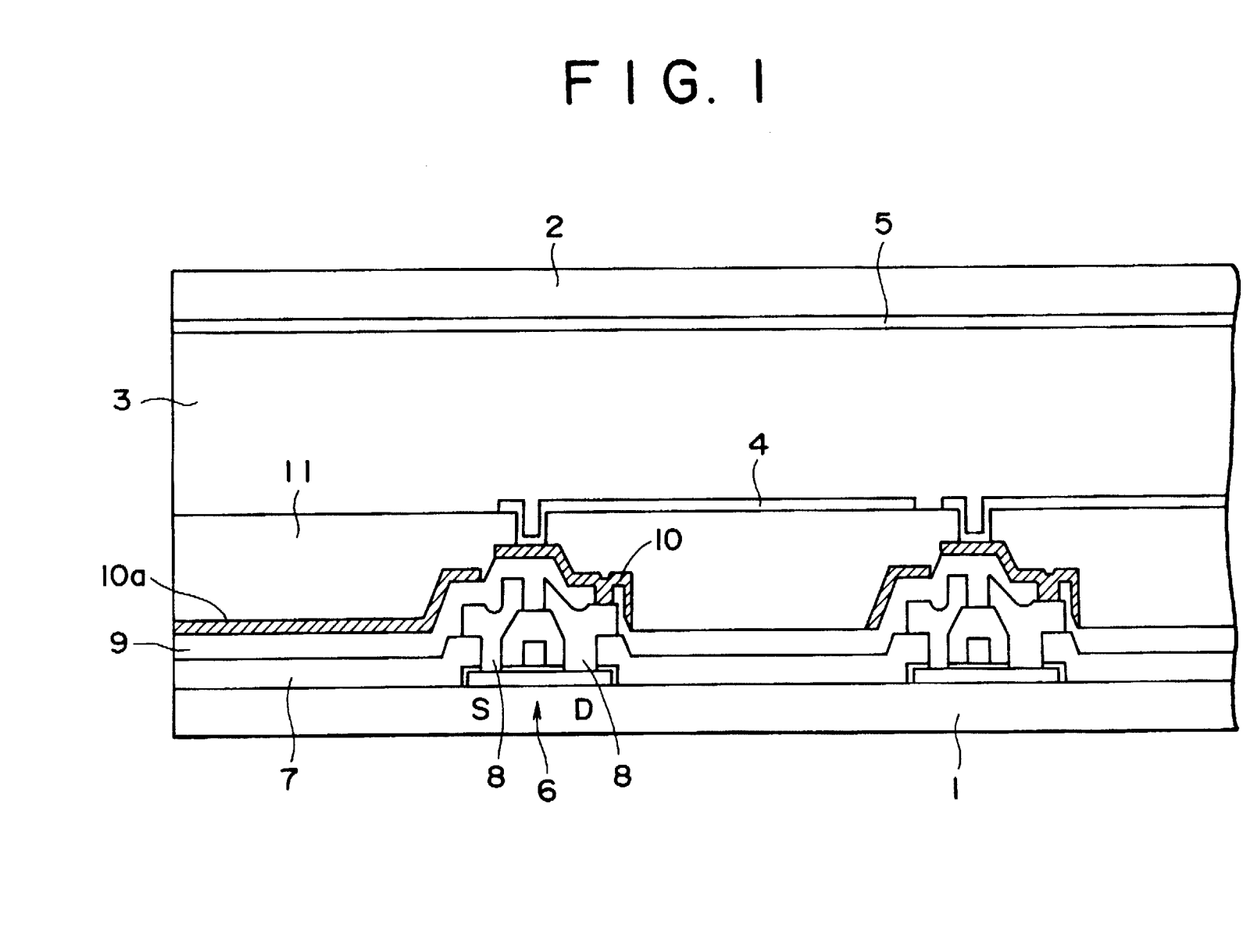
FIG. 1 is a cross-sectional diagram showing principal elements of a first embodiment implementing a display device in accordance with the present invention.

The present invention will become more apparent from the following detailed description of preferred embodiments with reference to accompanying diagrams. FIG. 1 is a cross-sectional diagram showing principal elements of a first embodiment implementing a display device in accordance with the present invention. As shown in the figure, the display device has a panel structure comprising a drive substrate 1 made of glass or the like and a opposed substrate 2 which is, much like the drive substrate 1, made of glass or the like and joined to the drive substrate 1 through a predetermined gap. A liquid crystal 3 is held as an electro-optical material in the gap between the drive and opposed substrates 1 and 2. Pixel electrodes 4 are patterned in a matrix form on the drive substrate. The pixel electrodes 4 are made of a transparent dielectric film such as ITO or $SnO_2$. On the other hand, opposed electrodes 5 also made of a transparent dielectric film are formed over the entire inner surface of the opposed substrate 2.

The present invention is characterized in that the following components are formed on the drive substrate 1: a plurality of thin film transistors 6 for individually switching the pixel electrodes 4; a first interlayer insulating film 7 for covering the thin film transistors 6; interconnect electrodes 8 each electrically connected to one of the thin film transistors 6 which interconnect electrodes 8 are patterned; a second interlayer insulating film 9 for covering the interconnect electrodes 8; and a black matrix 10 for shielding the thin film transistors 6 from light beneath the second interlayer insulating film 9, which black matrix 10 is patterned above the second interlayer insulating film 9.

Furthermore, the black matrix 10 is covered by a planerization layer 11 and the pixel electrodes 4 are patterned on the flattening film 11.

The black matrix 10 is comprised of a metal film such as Ti, Al or Cr. In particular, Ti has a cylindrical crystal structure and an excellent etching characteristic, allowing a precise black-matrix pattern to be fabricated. As described above, the black matrix 10 shields the thin film transistors 6 from external light. In this embodiment, a black matrix 10a is further extended also to the peripheral portion. On the other hand, the pixel electrodes 4 are connected to the interconnect electrodes 8 on the drain-region (D) side through the black matrix 10, while the interconnect electrodes 8 on the source-region (S) side constitute signal lines. The interconnect electrodes 8 are made up of typically Al, Cu, Ti, Mo, W or an alloy thereof. As described earlier, the interconnect electrodes 8 are covered by the second interlayer insulating film 9 which is made of PSG, NSG, $SiO_2$, SiN or the like, being electrically insulated from the black matrix 10.

Next, a method for manufacturing the display device provided by the present invention is described concisely by referring to FIG. 1. First of all, the thin film transistors 6 are formed by integrating them on the drive substrate 1 which is typically made of glass and then covered by the first interlayer insulating film 7. Subsequently, contact holes connecting to the source regions (S) and the drain regions (D) of the thin film transistors 6 are formed in the first interlayer insulating film 7. Then, an electrode material is formed into a film by the sputtering or CVD method. The electrode-material film is subsequently patterned into a predetermined form to produce the interconnect electrodes 8. The interconnect electrodes 8 connected to the source regions (S) each serve as a signal line and, in some cases, function as a black matrix. The second interlayer insulating film 9 overlapping these interconnect electrodes 8 serve as a cover thereof. Contact holes formed in the second interlayer insulating film 9 allow portions of the interconnect electrodes 8 electrically connected to the drain regions (D) of the thin film transistors 6 to be exposed. Later on, a metal film is formed by the sputtering of CVD method. The metal film is then etched into a pattern having a predetermined form, being fabricated to produce the black matrix 10. The black matrix 10 is covered by the planerization layer 11 which is comprised of transparent acrylic resin or the like in order to absorb the unevenness of the surface of the drive substrate 1. Contact holes are formed in the planerization layer 11, exposing portions of the black matrix 10. Finally, a transparent dielectric film is deposited and formed into a predetermined pattern in a manufacturing process for producing the pixel electrodes 4. As a result, the pixel electrodes 4 are electrically connected to the drain regions (D) of the thin film transistors 6 through the black matrix 10 and the interconnect electrodes 8. In this way, since the black matrix 10 can be formed on the chip on the side of the opposed substrate 2, basically, only the opposed electrodes 5 are formed on the side of the opposed substrate 2. Therefore, it is not necessary to precisely adjust the positions of the drive and opposed substrates 1 and 2.

Figure 2:
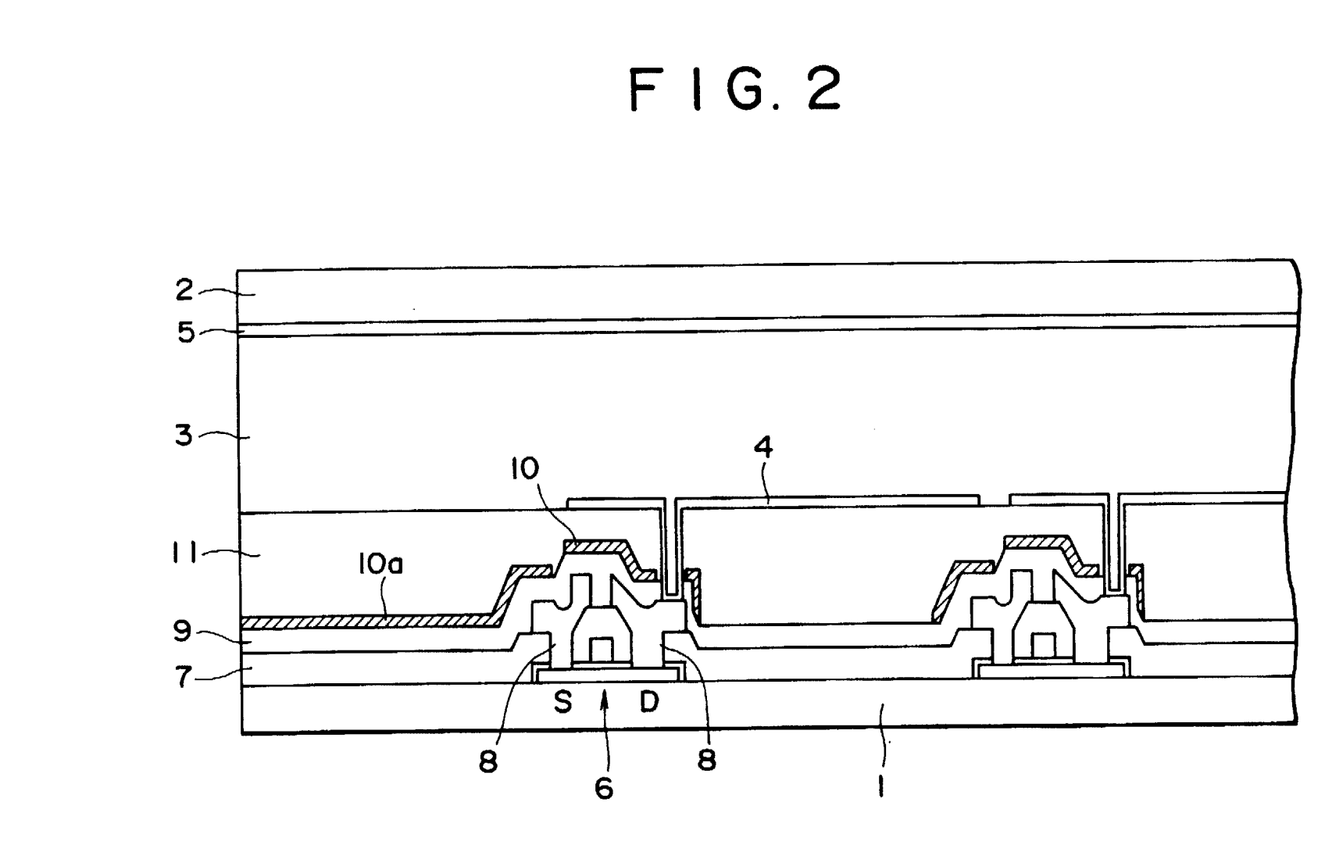
FIG. 2 is a cross-sectional diagram showing principal elements of a second embodiment implementing a display device in accordance with the present invention.

FIG. 2 is a cross-sectional diagram showing principal elements of a second embodiment implementing a display device in accordance with the present invention. The basic configuration of the second embodiment is the same as that of the first embodiment shown in FIG. 1. Components of the second embodiment identical with those employed in the first embodiment are assigned the same numeral numbers as those assigned to the latter in order to make the description easy to understand. The second embodiment is different from the first one in that, in the case of the second embodiment, the black matrix 10 covering the thin film transistors 6 is put at a floating potential. In such a scheme, the pixel electrodes 4 are connected directly to the interconnect electrodes 8 on the drain-region (D) side, bypassing the black matrix 10. In this structure, the black matrix 10 is put at a floating potential, eliminating the danger of applying an unnecessary electric field to the liquid crystal 3.

Figure 3A:
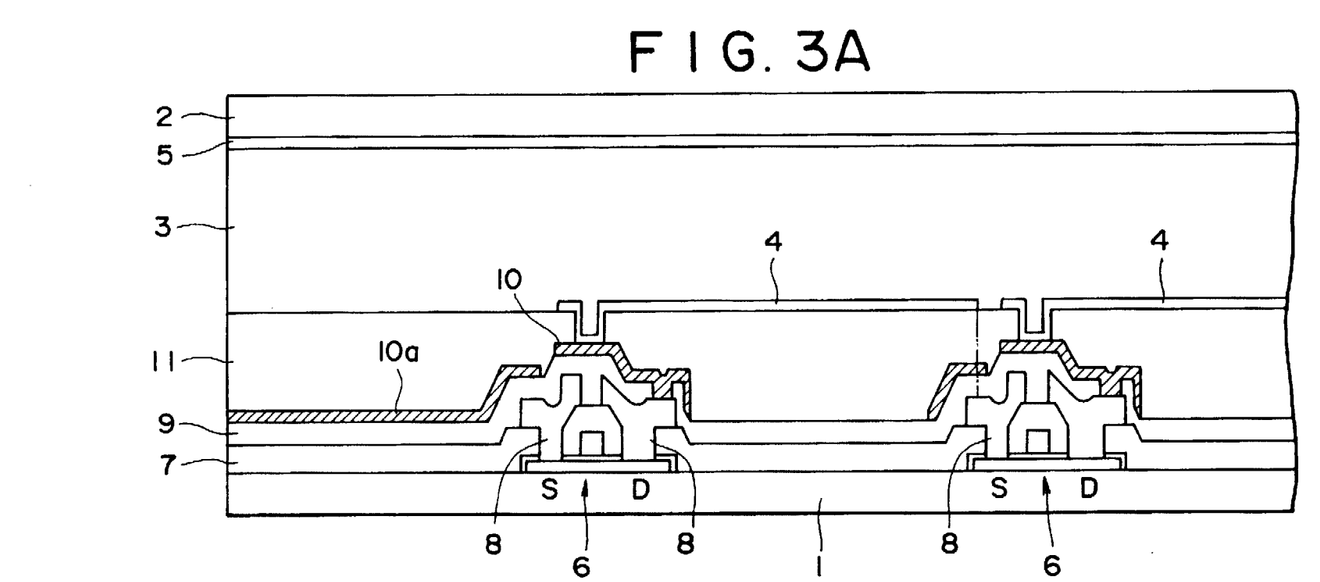
FIGS. 3A and 3B are cross-sectional diagrams showing principal elements of a third embodiment implementing a display device in accordance with the present invention and its plane diagram respectively.
Figure 3B:
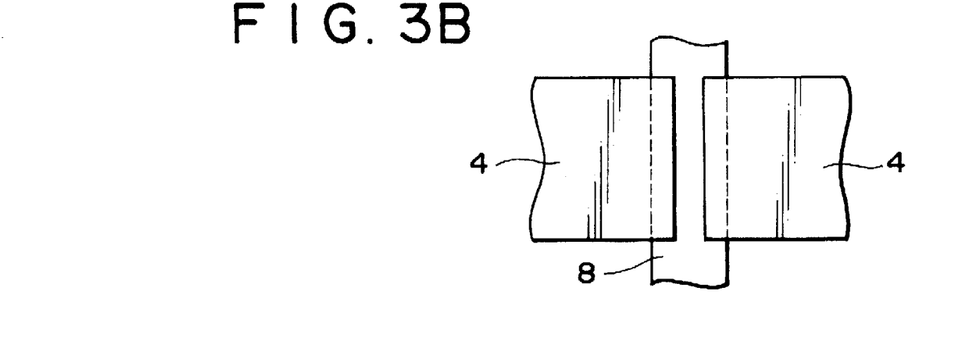

FIGS. 3A and 3B are cross-sectional diagrams showing principal elements of a third embodiment implementing a display device in accordance with the present invention and its plane diagram respectively. Basically, the configuration of the third embodiment is the same as that of the first embodiment shown in FIG. 1. Components of the third embodiment identical with those employed in the first embodiment are assigned the same numeral numbers as those assigned to the latter in order to make the description easy to understand. As shown in FIG. 3A, the interconnect electrodes 8 electrically connected to the source-region (S) side of the thin film transistors 6 each serve as a signal line. The interconnect electrodes 8 each partially overlap one of the pixel electrodes 4 above the interconnect electrodes 8, functioning as a black matrix bordering the pixel electrodes 4. This positional relation is shown in a partial plane diagram of FIG. 3B. As shown in FIG. 3B, an interconnect electrode 8 serving as a signal line overlaps portions of pixel electrodes 4, forming a black stripe.

Figure 4:
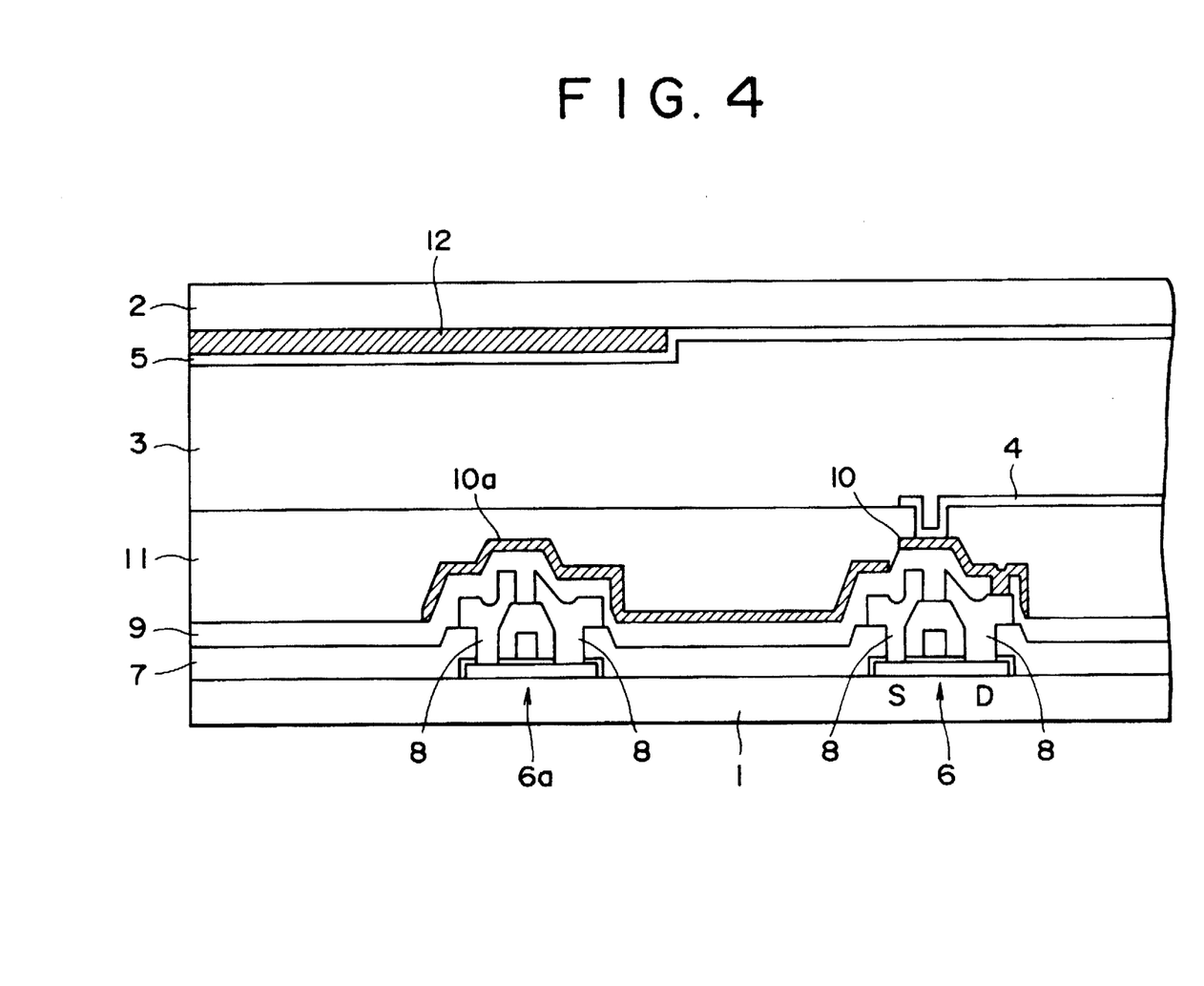
FIG. 4 is a cross-sectional diagram showing principal elements of a fourth embodiment implementing a display device in accordance with the present invention.

FIG. 4 is a cross-sectional diagram showing principal elements of a fourth embodiment implementing a display device in accordance with the present invention. The basic configuration of the fourth embodiment is the same as that of the first embodiment shown in FIG. 1. Components of the fourth embodiment identical with those employed in the first embodiment are assigned the same numeral numbers as those assigned to the latter in order to make the description easy to understand. As shown in the figure, the drive substrate 1 is divided into a pixel array unit including the pixel electrodes 4 and thin film transistors 6 for individually switching the pixel electrodes 4, and a peripheral unit including a drive circuit (not shown) for operating the pixel array unit. In this configuration, on the side of the oposed substrate 2 described above, a black mask 12 which is aligned with the peripheral unit is provided. In addition, the pixel array unit has effective pixels each comprising a pair of pixel electrode 4 and thin film transistor 6 for switching the pixel electrode 4, and dummy pixels each comprising a thin film transistor 6a with no pixel electrode driven by the thin film transistor 6a. The dummy pixels are entirely covered by a black matrix 10a. The dummy pixels are provided at several pixel positions so as to surround the effective pixels. In this way, the dummy pixels protect the effective pixels against, among other things, external elec-
trostatic stress by absorbing the stress. Accordingly, since the dummy pixels are subject to such stress concentratedly, the dummy pixels can get out of order or even be damaged easily. Addressing this problem, a black matrix 10a in this embodiment is extended so as to entirely cover the thin film transistors 6a composing the dummy pixels. In addition, this black matrix 10a partially overlaps a black mask 12 provided on the opposed-substrate side. As a result, the black matrix 10a and the black mask 12 jointly make the light-shielding effect for the display device more perfect. In addition, the black matrix 10a and the black mask 12 overlap each other at a relatively large margin, making it unnecessary to accurately adjust the positions of the drive and opposed substrates 1 and 2.

Next, a method of manufacturing the present display device is described by referring to FIG. 4. First of all, thin film transistors 6 and 6a are formed on a drive substrate 6 which is made of glass or the like. The thin film transistors 6 and 6a are then covered by a first interlayer insulating film 7. Subsequently, a contact hole is formed in the first interlayer insulating film 7 in order to partially expose a source region S and a drain region D of the thin film transistor 6. In this case, it is actually not necessary to make a contact hole for the thin film transistor 6a which pertains to a dummy pixel. In the case of this embodiment, none the less, much like the thin film transistor 6 pertaining to an effective pixel, a contact hole is formed for the thin film transistor 6a pertaining to a dummy pixel as well. Then, an electrode material is formed into a film by the sputtering or CVD method. The electrode-material film is subsequently patterned into a predetermined form to produce the interconnect electrodes 8. Subsequently, a second interlayer insulating film 9 is formed. A contact hole is then formed in the second interlayer insulating film 9 to partially expose the interconnect electrodes 8 electrically connected to the drain regions (D) of the thin film transistors 6. On the other hand, no contact hole is formed for the thin film transistor 6a pertaining to a dummy pixel. Later on, a metal film is formed by means of the sputtering of CVD method. The metal film is then patterned into a predetermined form, being fabricated to produce the black matrices 10 and 10a. As shown in the figure, the black matrix 10a completely shields the thin film transistor 6a pertaining to a dummy pixel. After a planerization layer is formed thereon, a contact hole continuing to the black matrix 10 is drilled. Finally, a transparent dielectric film is formed into a predetermined pattern in a fabrication process for producing a pixel electrode 4. However, no pixel electrode 4 is provided for the dummy pixel. On the other hand, a black mask 12 is formed only on the circumference on the side of the facing substrate 2. A film for opposed electrodes 5 is formed from a material such as ITO on this black matrix 12, overlapping it. As described above, in this embodiment, several pixels on the circumference of a pixel array unit are used as dummy pixels which are entirely shielded by a black matrix. Since the several pixels on the circumference are prone to generating defects due to causes such as damages, noise or video-signal fluctuations, they are deliberately used as dummy pixels. In addition, a black matrix is provided on the opposed-substrate side for shielding the peripherals. With this configuration, the display device can be assembled without damaging the effective pixels and without the need for positional adjustment.

Figure 5:
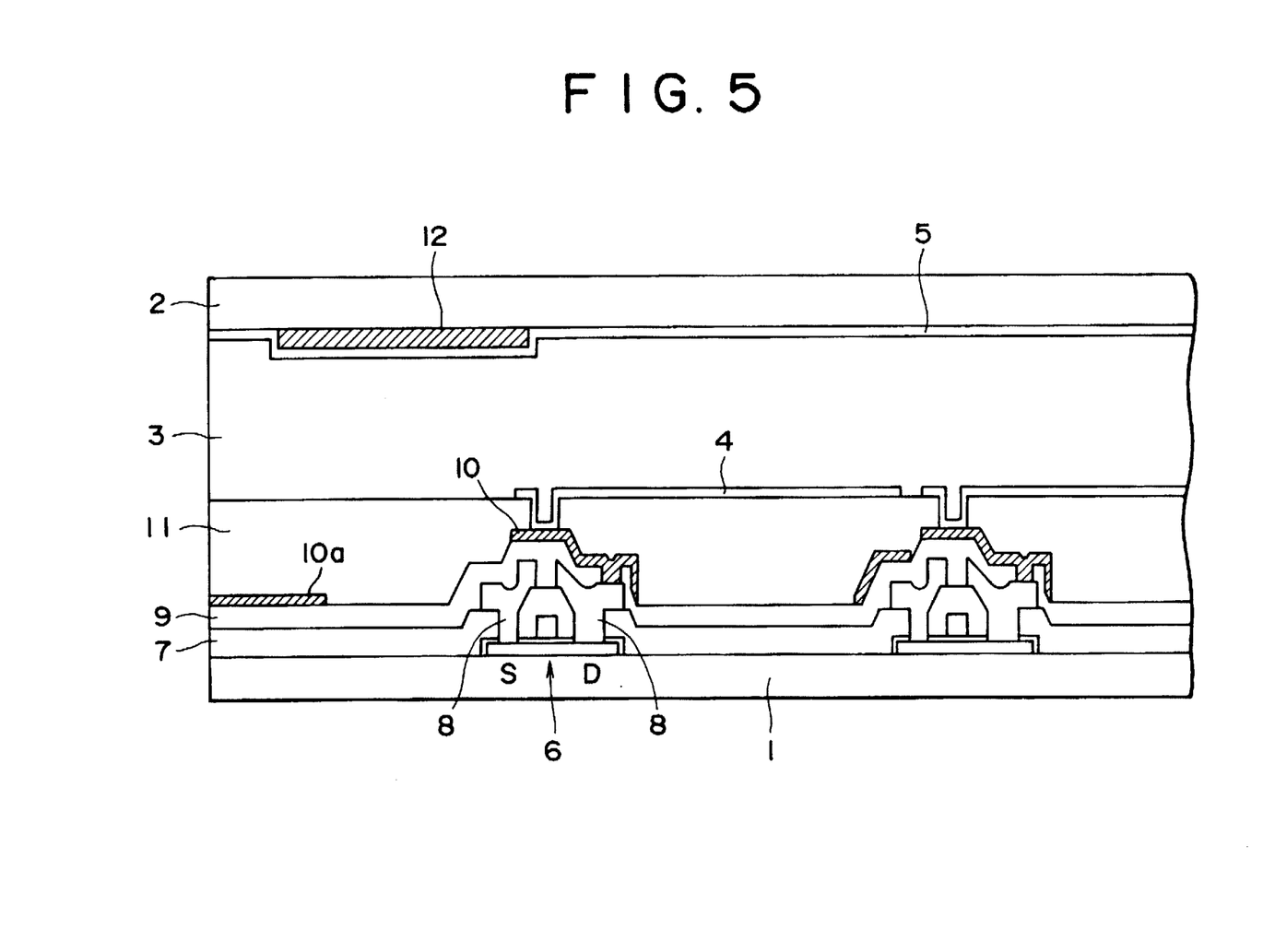
FIG. 5 is a cross-sectional diagram showing principal elements of a fifth embodiment implementing a display device in accordance with the present invention.

FIG. 5 is a cross-sectional diagram showing principal elements of a fifth embodiment implementing a display device in accordance with the present invention. The basic configuration of the fifth embodiment is the same as that of the first embodiment shown in FIG. 1. Components of the fifth embodiment identical with those employed in the first embodiment are assigned the same numeral numbers as those assigned to the latter in order to make the description easy to understand. Much like the fourth embodiment shown in FIG. 4, the drive substrate 1 in the fifth embodiment is divided into a pixel array unit including the pixel electrodes 4 and thin film transistors 6 for individually switching the pixel electrodes 4, and a peripheral unit including a drive circuit (not shown) for operating the pixel array unit. In this configuration, on the side of the opposed substrate 2 described above, a black mask 12 which aligns with the peripheral unit is provided. On the other hand, a black matrix 10 provided on the side of the drive substrate 1 is added to regions of the thin film transistors 6 included in pixel array unit and part of a black matrix 10a is extended to the region of the peripheral unit excluding the drive circuit. The black mask 12 provided on the side of the opposed substrate 2 selectively shields only the region of the drive circuit.

Figure 6:
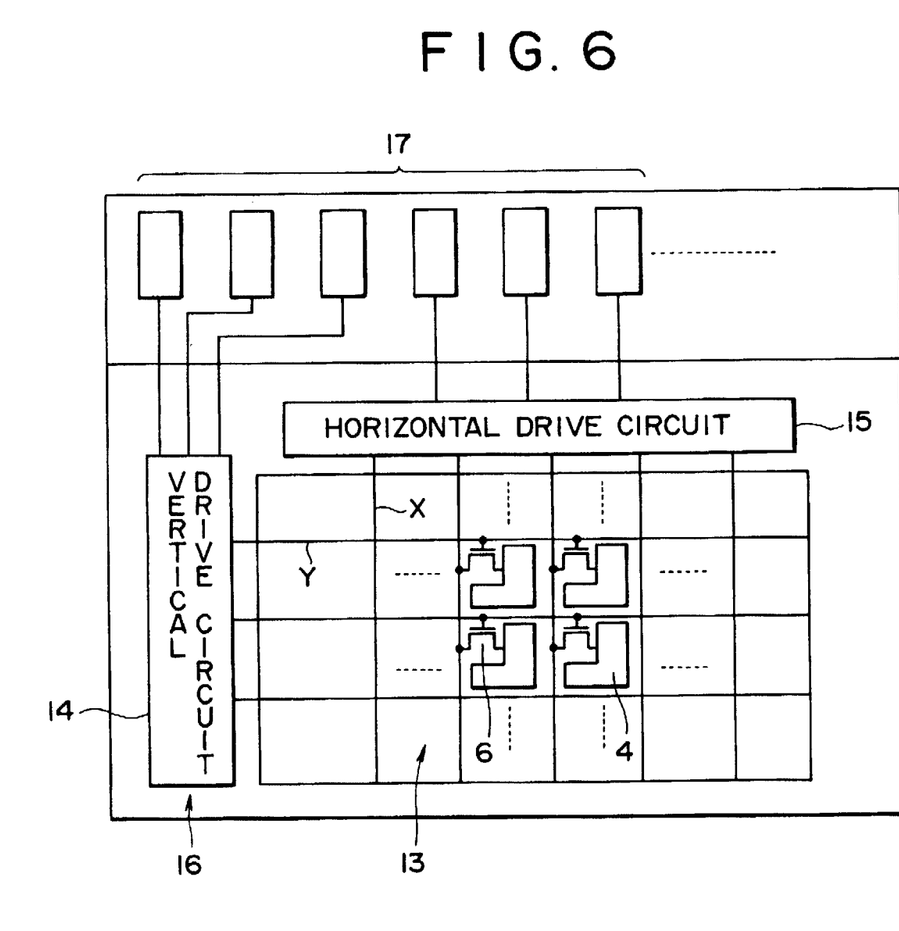
FIG. 6 is a plane model diagram showing the fifth embodiment.

Description regarding a relation between positions of the black matrices 10 and 10a and the black mask 12 described above with reference to a plane drawing shown in FIG. 6 is added. As shown in the figure, the drive substrate 1 is divided into a pixel array unit 13 including the pixel electrodes 4 and thin film transistors 6 for individually switching the pixel electrodes 4, and a peripheral unit 16 including a vertical drive circuit 14 and a horizontal drive circuit 15 for operating the pixel array unit 13. It may be noted that signal lines X and gate lines Y perpendicular to the signal lines X are provided on the pixel array unit 13. In addition, terminals 17 for external connection are provided at the upper end of the drive substrate 1. In this configuration, a black matrix provided on the side of the drive substrate 1 covers regions of the thin film transistors 6 in the pixel array unit 13 and, in addition, is also extended to a region of the peripheral unit excluding the vertical drive circuit 14 and the horizontal drive circuit 15. On the other hand, the black matrix provided on the side of the opposed substrate 2 selectively shields only the regions of the vertical drive circuit 14 and the horizontal drive circuit 15. If now, for example, the vertical drive circuit 14 and the horizontal drive circuit 15 with much unevenness are shielded by the black matrix on the drive-substrate side, short-circuit failures and electrostatic damages are most likely generated, leading to defects. Addressing this problem, only the regions of the vertical drive circuit 14 and the horizontal drive circuit 15 are shielded by the black mask on the opposed-substrate side. It may be noted that, in some cases, the peripheral unit of the drive substrate 1 is provided with test terminals for use in, among other things, measurement of operations of the vertical drive circuit 14 and the horizontal drive circuit 15. In such a case, the black matrix can be extended to the peripheral region, shunning only the test terminals.

Figure 7:
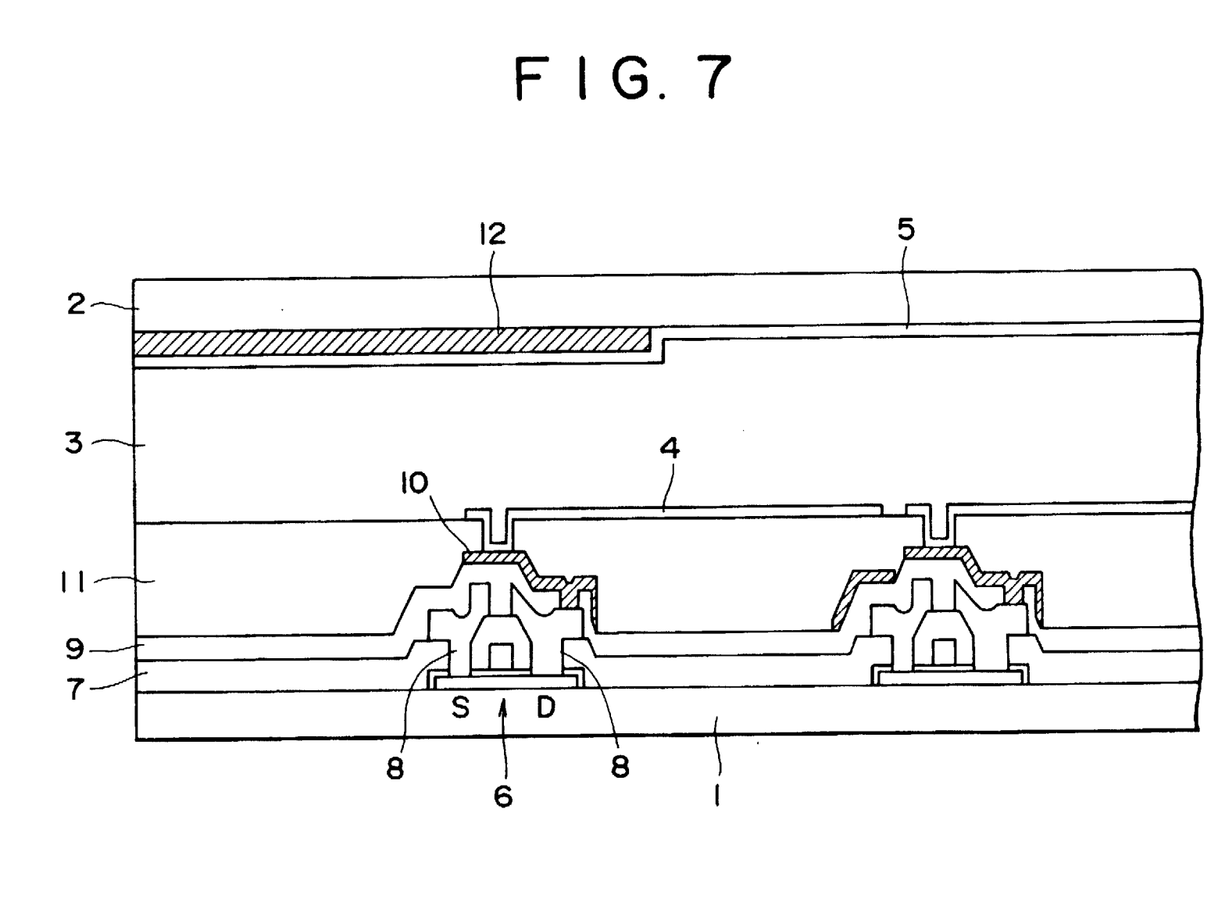
FIG. 7 is a cross-sectional diagram showing principal elements of a sixth embodiment implementing a display device in accordance with the present invention.

Finally, principal elements of a sixth embodiment implementing a display device in accordance with the present invention are shown in a cross-sectional diagram of FIG. 7. The basic configuration of the sixth embodiment is the same as that of the first embodiment shown in FIG. 1. Components of the sixth embodiment identical with those employed in the first embodiment are assigned the same numeral numbers as those assigned to the latter in order to make the description easy to understand. In the case of the first embodiment, the peripheral is shielded by the black matrix on the side of the drive substrate 1. In the case of the sixth embodiment, on the other hand, a black mask 12 is provided on the side of the opposed substrate 2 for shielding the peripheral unit.

As described above, a black matrix is formed on the drive-substrate side in accordance with the present invention, producing an effect of allowing the aperture ratio to be improved over the conventional value by greater than 1.4 times. In addition, all black matrices are formed on the drive-substrate side, leaving only facing electrodes on the facing-substrate side. As a result, the positional adjustment is not required any more. As another effect, since a black matrix is formed on the drive-substrate side and several circumference pixels are treated as dummy pixels, it is no longer necessary to carry out positional adjustment. As still another effect, only simple external forms need to be adjusted. As a result, the cost of an apparatus for alignment purposes and the cost of inspection can thereby be reduced substantially. The formation of the black matrix on the drive-substrate side makes it no longer necessary to form a planerization layer on the opposed-substrate side, producing an effect of increasing the transmittivity by several percents. Since it is no longer necessary to provide a planerization layer on the opposed-substrate side, gaps among pixels can be controlled with ease. As a result, surface unevenness is eliminated.

What is claimed is:
1. A display device comprising:
   a first substrate having a plurality of thin film transistors formed thereon, a first interlayer insulating film for covering said thin film transistors;
   interconnect electrodes formed on said first interlayer insulating film and connected to said thin film transistors;
   a second interlayer insulating film for covering said interconnect electrodes, and
   a first light-shielding layer formed on said second interlayer insulating film and used for shielding said film transistors beneath said second interlayer insulating film;
   a plurality of pixel electrodes formed above the first light-shielding layer;
   a second substrate joined to said first substrate through a predetermined gap and provided with facing electrodes; and
   an electro-optical material held in said gap wherein a planarization layer for covering said first light shielding layer is provided and said pixel electrodes are formed on said planarization layer.

2. A display device according to claim 1 wherein said first light-shielding layer is comprised of a metal film and said pixel electrodes are connected to interconnect electrodes beneath said pixel electrodes through said metal film.

3. A display device according to claim 1 wherein said first light-shielding layer is comprised of a metal film having a floating potential and said pixel electrodes are connected directly to said interconnect electrodes, without connecting said first light-shielding layer.

4. A display device according to claim 1 wherein said interconnect electrodes each partially overlap a pixel electrode end above said interconnect electrode, functioning as a light-shielding layer bordering said pixel electrodes.

5. A display device comprising:
   a first substrate having a plurality of thin film transistors formed thereon,
   a first interlayer insulating film for covering said thin film transistors;
   interconnect electrodes formed on said first interlayer insulating film and connected to said thin film transistors;
   a second interlayer insulating film for covering said interconnect electrodes, and a first light-shielding layer formed on said second interlayer insulating film and used for shielding said film transistors beneath said second interlayer insulating film;

a plurality of pixel electrodes formed above the first light-shielding layer;

a second substrate joined to said first substrate through a predetermined gap and provided with facing electrodes; and an electro-optical material held in said gap wherein a planarization layer for covering said first light shielding layer is provided and said pixel electrodes are formed on said planarization layer, wherein said first substrate is divided into a pixel array unit including said pixel electrodes and said thin film transistors each for switching one of said pixel electrodes and a peripheral unit including a drive circuit for operating said pixel array unit, and said second substrate has a second light-shielding layer aligning with said peripheral unit.

6. A display device according to claim 5 wherein said first light-shielding layer covers regions of said thin film transistors in said pixel array unit, and is also extended to a region of said peripheral unit excluding said drive circuit, and said second light-shielding layer selectively shields only a region of said drive circuit.

7. A display device according to claim 5 wherein said pixel array unit comprises effective pixels each comprising a pixel electrode and a thin film transistor for switching said pixel electrode and dummy pixels each comprising a thin film transistor with no pixel electrode, and said dummy pixels are entirely covered by said first light-shielding layer.

8. A display device according to claim 5 wherein said first light-shielding layer is comprised of a metal film and said pixel electrodes are connected to said interconnect electrodes beneath said pixel electrodes through said metal film.

9. A display device according to claim 5 wherein said first light-shielding layer is comprised of a metal film having a floating potential and said pixel electrodes are connected directly to said interconnect electrodes, without connecting said first light-shielding layer.

10. A display device according to claim 5 wherein said interconnect electrodes each partially overlap a pixel electrode end above said interconnect electrode, functioning as a light-shielding layer bordering said pixel electrodes.

11. A display device comprising:

a substrate;

a plurality of transistors formed on the substrate;

a first insulating film formed on said transistors;

a plurality of interconnect electrodes formed through the first insulating film and being connected to the transistors;

a second insulating film formed over said interconnect electrodes;

a first light-shielding film formed on the second insulating film over the transistors; and a plurality of pixel electrodes formed above the first light shielding film wherein a planarizing layer is formed between the first light-shielding layer and the pixel electrodes.

12. The display device of claim 11, wherein the first light-shielding film connects at least one pixel electrode with the drain of a transistor.

13. The display device of claim 11, wherein the pixel electrodes are insulated from the first light-shielding layer and are electrically connected to the drain of a transistor.

14. The display device of claim 11, further comprising a second substrate having a second light-shielding member aligned over a peripheral unit of said device.

15. The display device of claim 14, further comprising a dummy pixel formed on the first substrate and located beneath said second light-shielding layer.

* * * * *